US012362852B2

United States Patent
Chen

(10) Patent No.: US 12,362,852 B2
(45) Date of Patent: Jul. 15, 2025

(54) COMMUNICATION METHOD AND COMMUNICATION DEVICE THEREOF

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 464 days.

(21) Appl. No.: 17/950,085

(22) Filed: Sep. 21, 2022

(65) Prior Publication Data

US 2024/0022349 A1   Jan. 18, 2024

(30) Foreign Application Priority Data

Jul. 13, 2022   (TW) .................................. 111126310

(51) Int. Cl.
H04L 1/00   (2006.01)
(52) U.S. Cl.
CPC .................................. H04L 1/0039 (2013.01)
(58) Field of Classification Search
CPC ...... H04L 1/00; H04L 1/0039; H04B 10/0795
See application file for complete search history.

(56) References Cited

U.S. PATENT DOCUMENTS

| 6,278,735 B1 * | 8/2001 | Mohsenian | H04N 19/51 375/E7.157 |
| 11,342,946 B1 * | 5/2022 | Bhatia | H04B 1/1036 |
| 11,610,132 B2 * | 3/2023 | Hewage | G06N 3/08 |
| 11,715,004 B2 * | 8/2023 | Zhang | G06N 3/08 706/20 |
| 11,909,482 B2 * | 2/2024 | Namgoong | G06N 3/088 |
| 2015/0043323 A1 * | 2/2015 | Choi | H04B 1/62 370/203 |
| 2020/0394512 A1 * | 12/2020 | Zhang | G06N 7/023 |
| 2024/0056983 A1 * | 2/2024 | Chen | H04W 52/223 |

(Continued)

FOREIGN PATENT DOCUMENTS

| CN | 112637094 A | 4/2021 |
| JP | 2006-211131 A | 8/2006 |
| JP | 2021-500813 A | 1/2021 |

(Continued)

OTHER PUBLICATIONS

Phillip Lippe et al., iCITRIS: Causal Representation Learning for Instantaneous Temporal Effects, Jun. 13, 2022, p. 1-48, XP091245967, Jun. 13, 2022.

(Continued)

Primary Examiner — Hai V Nguyen
(74) Attorney, Agent, or Firm — Winston Hsu

(57) ABSTRACT

A communication method, for a receiver, including receiving a received signal, and obtaining information of an original signal according to the received signal. A transmitter obtains a transmitted signal according to the original signal. The transmitter sends the transmitted signal. The transmitted signal is changed to the received signal after passing through a channel. The transmitted signal and the received signal are correlated using a structural causal model. A number of a plurality of causal variables of a causal graph of the structural causal model and a causal structure of a causal graph of the structural causal model are determined together.

16 Claims, 8 Drawing Sheets

(56) References Cited

U.S. PATENT DOCUMENTS

2024/0169222 A1\* 5/2024 Chen .................... H04B 7/0452

FOREIGN PATENT DOCUMENTS

| KR | 10-2022-0009188 A | | 1/2022 | | |
|----|-------------------|---|--------|---|---|
| KR | 20220009188 A | \* | 1/2024 | ......... | H04B 10/0795 |
| KR | 102753303 B1 | \* | 1/2025 | ......... | H04B 10/0795 |

OTHER PUBLICATIONS

Benben Jiang et al., Simultaneous Identification of Bidirectional Path Models Based on Process Data, IEEE Transactions on Automation Science and Engineering, vol. 12, No. 2, Apr. 2015, p. 666-679, XP011577516, Apr. 2015.
Johann Brehmer et al., Weakly supervised causal representation learning, May 30, 2022, p. 1-33, XP091228380, May 30, 2022.
Jithin Jagannath et al., Machine Learning for Wireless Communications in the Internet of Things: A Comprehensive Survey, Jul. 22, 2019, p. 1-97, XP081444168, Jul. 22, 2019.
Christian Toth et al., Active Bayesian Causal Inference, Jun. 4, 2022, p. 1-26, XP091240078, Jun. 4, 2022.

\* cited by examiner

COMMUNICATION METHOD AND COMMUNICATION DEVICE THEREOF

BACKGROUND OF THE INVENTION

1. Field of the Invention

The present invention relates to a communication method and a communication device thereof, and more particularly, to a communication method and a communication device thereof which reduce transmission error rate.

2. Description of the Prior Art

In wireless communication, when a signal goes through a medium such as air (referred to as a channel), the signal may be polluted (after noise is added to the signal), interfered with other signals, or get distorted (e.g., attenuated, phase-shifted). The received signal is thus not the same as the transmitted signal. To properly decode the received signal, it is necessary to remove the distortion and noise caused by the channel from the received signal to obtain the original signal.

In $5^{th}$ generation mobile networks (5G) user scenario, if the signal sent by a radio unit is to be recovered to the original signal at user side (e.g., UE side), it requires channel estimation and a channel matrix, which is based on statistical association (for example, a reference signal is sampled/provided at certain time or frequency to calculate the value(s) of certain element(s) of the channel matrix). Using a channel matrix to correlate the received signal and the transmitted signal is not accurate given that statistical association does not imply cause-and-effect relationship. Also, at the user side, it needs to do channel estimation which costs a lot of design, power and CPU utilizations. Therefore, there is still room for improvement in calculating/figuring out the original signal when it comes to how to reduce transmission error rate.

SUMMARY OF THE INVENTION

It is therefore a primary objective of the present invention to provide a communication method and a communication device thereof to reduce transmission error rate.

An embodiment of the present invention discloses a communication method, for a receiver, comprising receiving a received signal, wherein a transmitter obtains a transmitted signal according to an original signal, the transmitter sends the transmitted signal, and the transmitted signal is changed into the received signal after passing through a channel; and obtaining information of the original signal according to the received signal, wherein the transmitted signal and the received signal are correlated using a structural causal model, and a plurality of causal variables and a causal structure of a causal graph of the structural causal model between the transmitted signal and the received signal are determined together.

An embodiment of the present invention discloses a communication device, for a receiver, comprising a storage circuit, configured to store instructions and a processing circuit, coupled to the storage device, configured to execute the instructions stored in the storage circuit. The instructions comprises receiving a received signal, wherein a transmitter obtains a transmitted signal according to an original signal, the transmitter sends the transmitted signal, and the transmitted signal is changed into the received signal after passing through a channel; and obtaining information of the original signal according to the received signal, wherein the transmitted signal and the received signal are correlated using a structural causal model, and a plurality of causal variables of a causal graph of the structural causal model and a causal structure of the causal graph are determined together.

An embodiment of the present invention discloses a communication method, for a transmitter, comprising obtaining a transmitted signal according to an original signal; transmitting the transmitted signal, wherein the transmitted signal is changed into a received signal after passing through a channel, a receiver obtains information of the original signal according to the received signal, the transmitted signal and the received signal are correlated using a structural causal model, and a plurality of causal variables of a causal graph of the structural causal model and a causal structure of the causal graph are determined together.

An embodiment of the present invention discloses a communication device, for a transmitter, comprising a storage circuit, configured to store instructions and a processing circuit, coupled to the storage device, configured to execute the instructions stored in the storage circuit. The instructions comprises obtaining a transmitted signal according to an original signal; transmitting the transmitted signal, wherein the transmitted signal is changed into a received signal after passing through a channel, a receiver obtains information of the original signal according to the received signal, the transmitted signal and the received signal are correlated using a structural causal model, and a plurality of causal variables of a causal graph of the structural causal model and a causal structure of the causal graph are determined together;

These and other objectives of the present invention will no doubt become obvious to those of ordinary skill in the art after reading the following detailed description of the preferred embodiment that is illustrated in the various figures and drawings.

DETAILED DESCRIPTION

Figure 1:
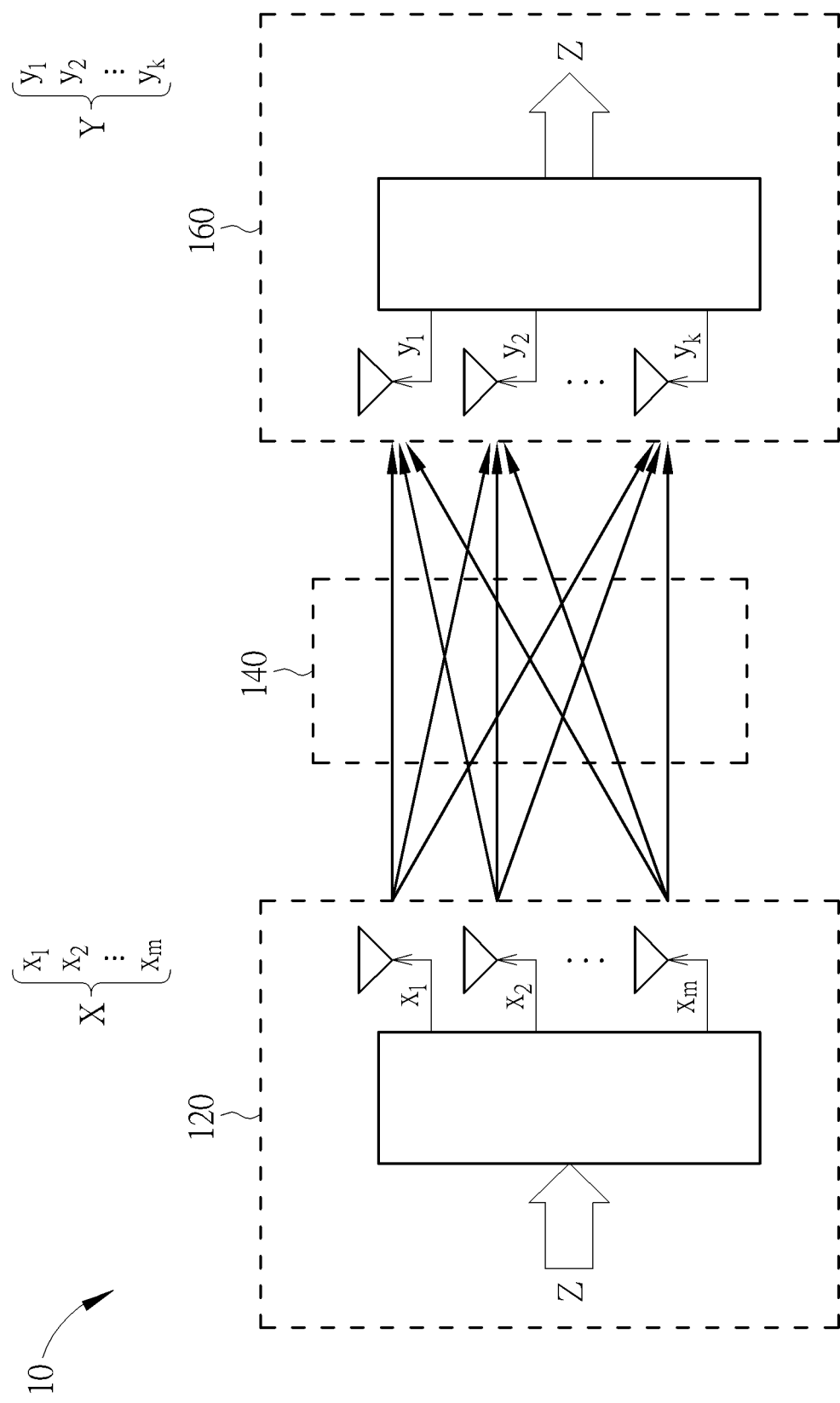
FIG. 1 is a schematic diagram of a communication system according to an embodiment of the present invention.

FIG. 1 is a schematic diagram of a communication system 10 according to an embodiment of the present invention. The communication system 10 may include a transmitter (or transmitting side) 120 and a receiver (or receiving side) 160.

In one embodiment, the transmitter 120 may send an original signal Z which serves as a transmitted signal X. In other words, the original signal Z is substantially the same as the transmitted signal X (e.g., Z=X). The original signal Z may include transmitted signal components $x_1$-$x_m$, and the transmitted signal X may include the transmitted signal components $x_1$-$x_m$, where m is a positive integer. Each of the transmitted signal components $x_1$-$x_m$ may be transmitted by at least one of transmitting antennas of the transmitter 120 over a medium such as air (referred to as a channel 140). The transmitted signal X (which may include data, reference signal(s) (which may be omitted in some embodiments), or other signals) may be transformed/distorted through the channel 140 to become a received signal Y.

The receiver 160 may receive/detect the received signal Y. The received signal Y may include received signal components $y_1$-$y_k$, where k is a positive integer. Each of the received signal components $y_1$-$y_k$ may be received by at least one of receiving antennas of the receiver 160. The receiver 160 may transform/convert the received signal Y into a signal equal to or similar to the original signal Z (to approximate the original signal Z).

In one embodiment, the transmitted signal X, the original signal Z, and the received signal Y may satisfy Y=HX+N or Y=HZ+N, where H is a channel matrix of the channel 140 (which may be an m×k matrix), and N is noise (which may include components $n_1$-$n_k$). In other words, the received signal Y received by the receiving antennas of the receiver 160 may include the noise N and the transmitted signal X distorted by the channel matrix H. The transmitted signal X and the received signal Y are correlated by using the channel matrix H. The receiver 160 may remove the distortion and the noise N caused by the channel 140 according to X=H⁻$_1$(Y−N) or Z=H$^{-1}$(Y−N) to obtain/infer/recover the transmitted signal X (i.e., to obtain/infer the original signal Z).

In one embodiment, a causal model (e.g., Structural Causal Model (SCM)) may replace the channel matrix H to obtain/infer/recover the transmitted signal X (i.e., to figure out the original signal Z). When the transmitted signal X and the received signal Y are correlated using a causal model, the transmitted signal X causing the received signal Y may be determined/calculated at least based on abductive reasoning (i.e., backward reasoning) (by the receiver 160). (That is, the transmitted signal X may be abducted from the received signal Y as a result of inferring the transmitted signal X as an explanation of the received signal Y. It may leverage abductive reasoning to reversely infer which transmitted signal causes the received signal Y.) In this manner, the received signal Y is converted to generate/reconstruct a signal equal to or similar to the transmitted signal X, thereby improving prediction accuracy and reducing the number of training samples required.

Figure 2:
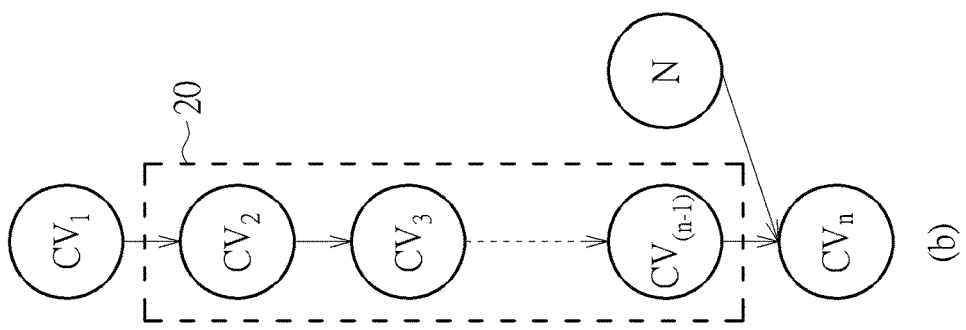
FIG. 2 and FIG. 3 are schematic diagrams of a causal model according to an embodiment of the present invention.
Figure 2:
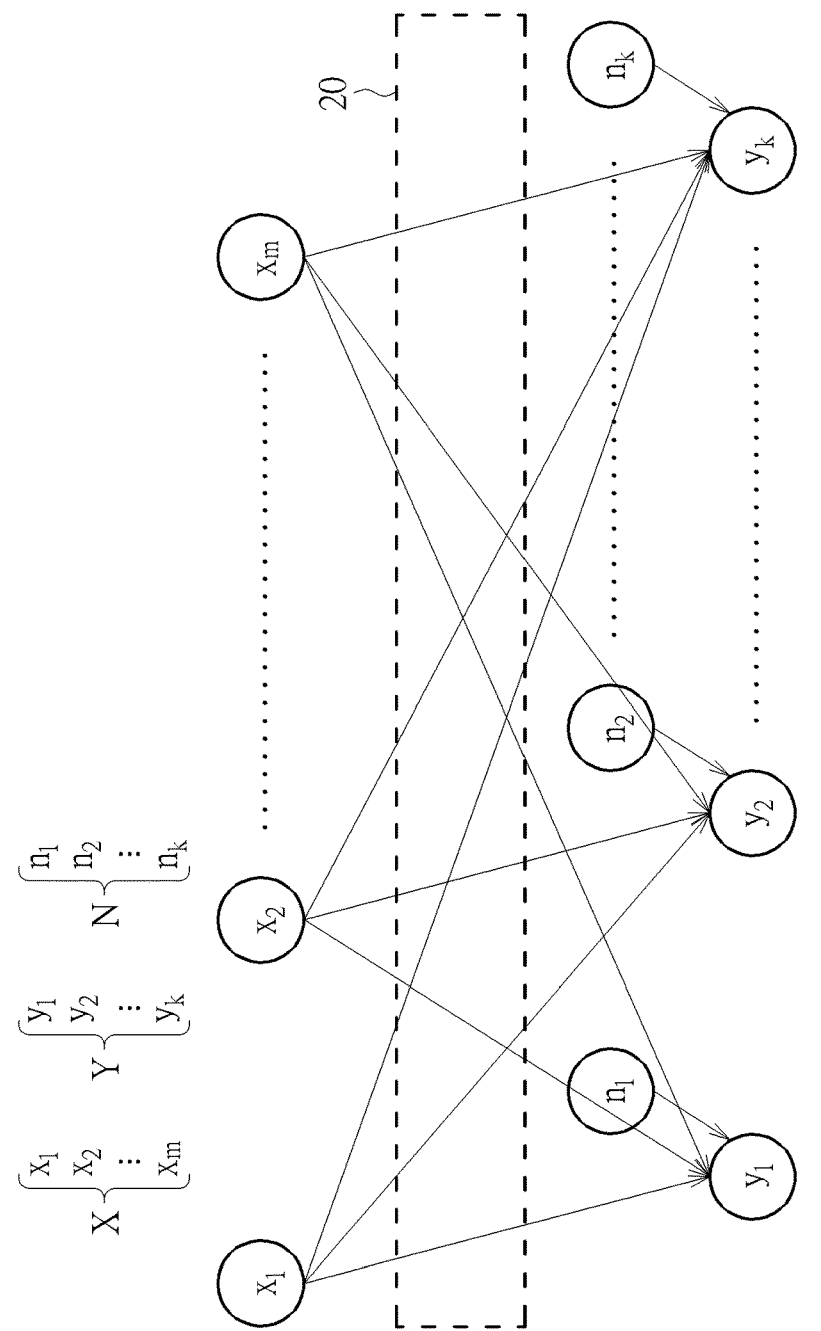
Figure 3:
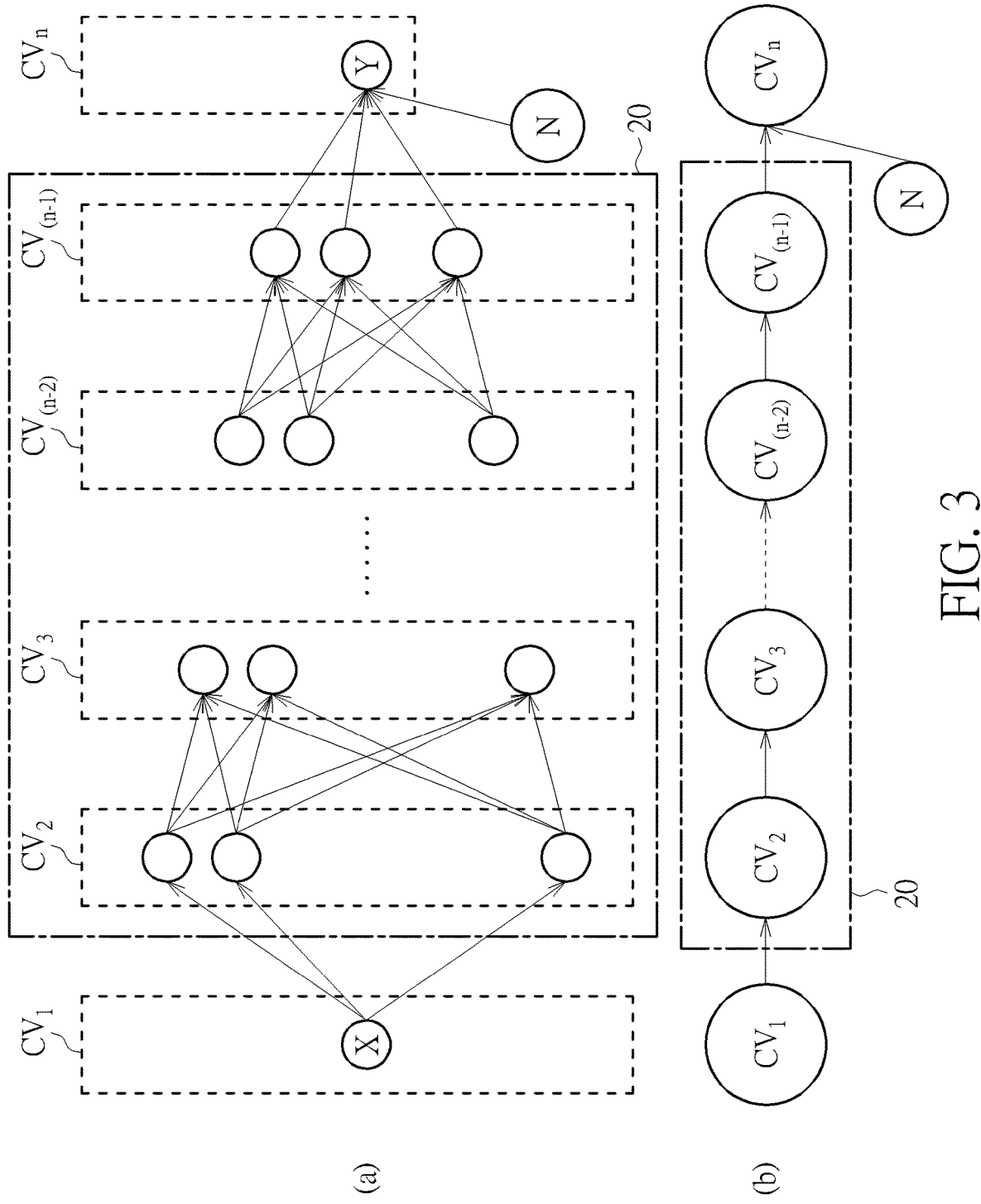

For example, FIG. 2 and FIG. 3 are schematic diagrams of a causal model 20 according to an embodiment of the present invention. The causal model 20 is implemented or realized by one of the transmitter 120, the receiver 160 and a distributed unit (DU). As shown in (a) of FIG. 2, the causal model 20 may replace a deep learning model or the channel matrix H, so that the transmitted signal X may be abducted or reversely inferred from the received signal Y according to abductive reasoning (that is, the original signal Z is found/determined). As shown in (b) of FIG. 2 and FIG. 3, a causal variable $CV_1$ may represent the transmitted signal X (e.g., the attribute(s) of the causal variable $CV_1$ correspond(s) to the transmitted signal X). The causal variable $CV_n$ may represent the (predicted/inferred) received signal Y, where n is a positive integer. The causal variables $CV_1$-$CV_n$ constitute a causal graph, which may be used by the causal model 20. N may represent noise.

In other words, the transmitted signal X and the received signal Y may be correlated by using the causal model 20. The communication system 10 performs encoding, decoding, or channel estimation according to the causal model 20. Abductive reasoning allows inferring the transmitted signal X (serving as a precondition) from the received signal Y (serving as a consequence). The transmitted signal X that leads to the received signal Y may be inferred/calculated at least based on abductive reasoning (by the receiver 160), such that the received signal Y is processed/converted to approximate/reproduce the transmitted signal X. Although there are many alternative possibilities (for the transmitted signal X) which result in the received signal Y, a causal graph used by the causal model 20 helps to infer one or some of alternative possibilities (for the transmitted signal X) from the received signal Y based on abductive reasoning.

In one embodiment, since there may be a number of combinations/alternatives (X, N) of noises (denoted by N) and transmitted signals (referred to as candidate transmitted signals and denoted by X), which possibly cause the received signal Y, the present invention may at least rely on an estimated signal-to-noise ratio (SNR) (or other algorithm) to select the most likely one combination (X, N), which includes a noise (denoted by N) and a transmitted signal (referred to as an optimal transmitted signal and denoted by X) most likely to result in the received signal Y, from the Pareto set (i.e., combinations/alternatives (X, N)). For example, when the signal-to-noise ratio is 64, a (candidate) transmitted signal (denoted by X) which is about 64 times (or 10 times . . . 100 times) as much as its noise (denoted by N) in the combination (X, N) may be selected as the (optimal) transmitted signal (denoted by X). When the signal-to-noise ratio is 8, a (candidate) transmitted signal (denoted by X) which is about 8 times (or 1 times . . . 10 times) as much as its noise (denoted by N) in the combination (X, N) may be selected as the (optimal) transmitted signal (denoted by X). Error rate of transmission between the transmitter 120 and the receiver 160 may be lowered by this kind of channel estimation of the causal model 20.

In one embodiment, a causal model 20 for optimization may be selected based on maximum a posterior (MAP) and point estimation. Accordingly, causal variables of a causal graph of the causal model 20 (e.g., the number of the causal variables, attributes of a causal variable, the number of the attributes of a causal variable) and a causal structure of the causal graph (e.g., how attributes connect to each other) are determined/found/created together (at a time or in one go). Deciding the causal variables and the causal structure simultaneously may avoid problems incurred by deciding first causal variables and then a causal structure.

Figure 4:
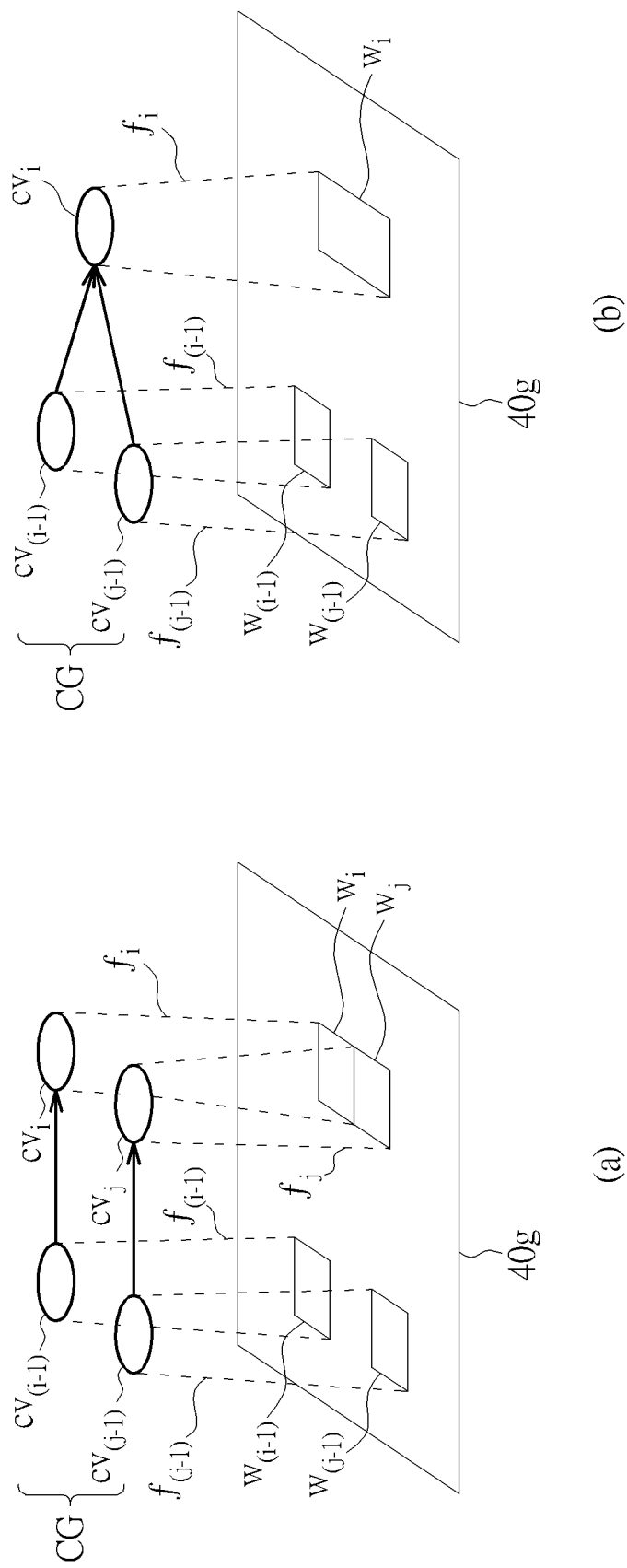
FIG. 4 is a schematic diagram of grounding data and part of a causal graph according to an embodiment of the present invention.

For example, FIG. 4 is a schematic diagram of grounding data 40g and part of a causal graph CG according to an embodiment of the present invention. In FIG. 4, (a) and (b) respectively illustrate two possibilities of the grounding data 40g and the causal graph CG. The causal graph CG may serve as a causal graph used by causal model 20.

In one embodiment, the grounding data 40g may be obtained or derived from the space of all observable samples, and thus may be referred to as observation data. In one embodiment, the grounding data 40g may be obtained or derived from all the data having been collected. In one embodiment, the grounding data 40g may be a solution space (i.e., observation data) of feature vectors of received signals or transmitted signals. In one embodiment, the grounding data 40g may include or be related to all signals received by the receiver 160 (e.g., the received signal Y) or sent out by the transmitter 120 (e.g., the transmitted signal X) at any time in any manner. In one embodiment, the state(s) or attribute(s) of the causal variable $CV_1$ (at all/any time) in FIG. 2 may be used as the grounding data 40g for at least part of the causal variable $CV_2$. By the same token, the state(s) or attribute(s) of the causal variable $CV_{(n-1)}$ (at all/any time) in FIG. 2 may be used as the grounding data $40g$ for at least part of the causal variable $CV_n$.

In FIG. 4, a causal structure of the causal graph CG may present the relationship between causal variables (e.g., $cv_{(i-1)}$, $cv_i$, $cv_{(j-1)}$, and $cv_j$). Observation functions $f_{(i-1)}$, $f_i$, $f_{(j-1)}$, and $f_j$ may be used to map data $w_{(i-1)}$, $w_i$, $w_{(j-1)}$, and $w_j$ of the grounding data $40g$ to the causal variables $cv_{(i-1)}$, $cv_i$, $cv_{(j-1)}$, and $cv_j$ so as to provide the relationship between the causal variables $cv_{(i-1)}$, $cv_i$, $cv_{(j-1)}$, and $cv_j$ and the data $w_{(i-1)}$, $w_i$, $w_{(j-1)}$, and $w_j$ of the grounding data $40g$. Here, i, j are positive integers. The mapping here is on a basis of the corresponding data (e.g., the data $w_i$) (e.g., a framed area in FIG. 4) instead of the (whole) grounding data $40g$.

In one embodiment, a posterior probability $P(f_i, C|w_i)$ of assigning the data $w_i$ of the grounding data $40g$ to the observation function $f_i$ and a causal structure C of the causal graph CG may be maximized so as to determine/derive the corresponding causal structure C and the corresponding causal variable $cv_i$ based on the data $w_i$ of the grounding data $40g$. Accordingly, inference of the causal model may be described by combining Bayesian network (e.g., for the causal structure) with the observation functions (e.g., $f_{(i-1)}$, $f_i$, $f_{(j-1)}$, and $f_j$). It is noteworthy that causal variables (e.g., $cv_{(i-1)}$, $cv_i$, $cv_{(j-1)}$, and $cv_j$) and the corresponding causal structure (e.g., C) of the corresponding causal graph (e.g., CG) are obtained/determined together (namely, the causal variables (e.g., $cv_{(i-1)}$, $cv_i$, $cv_{(j-1)}$, and $cv_j$) are learned along/together with the causal structure (e.g., C)), so the causal variables (e.g., $cv_{(i-1)}$, $cv_i$, $cv_{(j-1)}$, and $cv_j$) and the causal structure (e.g., C) may interact/affect/constrain each other.

In one embodiment, the posterior probability $P(f_i, C|w_i, Int)$ may satisfy $P(f_i, C|w_i, Int) \propto P(f_i, C) P(w_i|f_i, C, Int)$ according to the Bayesian rule, where $f_i$ may denote the corresponding observation function, C may denote the corresponding causal structure, $w_i$ may denote part of the grounding data $40g$, and Int may denote intervention. In one embodiment, the posterior probability $P(f_i, C|w_i)$ may be proportional to $$P(f_i, C)P(w_i | f_i, C) \text{ or } \prod_{t=0}^{T} P(w_{i,t} | s_{t-1}, C, f_i)^{(T-t)\cdot\gamma},$$

where $s_{t-1}$ may denote the state at a time instant $t-1$, T may denote a current/present time instant, and $\gamma$ may be 0.5, but is not limited thereto. In one embodiment, $P(w|f_i, C)$ may be $\prod_{t=0}^{T} P(w_{i,t}|s_{t-1}, C, f_i)$. In one embodiment, $P(w_{i,t}|s_{t-1}, C, f_i)$ may be $$\frac{1}{|R_{s_t}|} \prod_{i=1}^{Ncv} P(s_{i,t} | s_{t-1}, C)$$

or $$\frac{1}{|R_{s_t}|} \prod_{i=1}^{Ncv} P(S_{i,t} | s_{t-1}, C) \sum_{s_t} P(w_{i,t} | s_t, f_i) \prod_{i=1}^{Ncv} P(s_{i,t} | s_{t-1}, C),$$

where $s_{i,t}$ may denote the state of the causal variable $cv_i$ at a time instant t, Ncv may denote the total number of all causal variables (e.g., including the causal variables $cv_{(i-1)}$, $cv_i$, $cv_{(j-1)}$, and $cv_j$), Ncv is a positive integer, and $R_{s_t}$ may denote the data amount of the data $w_i$ which is compatible with the state $s_i$ of the causal variable $cv_i$ within the grounding data $40g$. In one embodiment, the present invention may select/find the causal variable $cv_i$ that minimizes the data amount $R_{s_i}$, such that data within the grounding data $40g$ which are frequently used (e.g., the data $w_i$) may be cut into finer pieces than those which are rarely used.

As set forth above, Bayesian probability mechanism may combine the number of causal variables (e.g., including the causal variables $cv_{(i-1)}$, $cv_i$, $cv_{(j-1)}$, and $cv_j$), states of the causal variables, a causal structure of the causal variables, and observation functions for the causal variables (e.g., including the observation functions $f_{(i-1)}$, $f_i$, $f_{(j-1)}$, and $f_j$) and draw relevant joint inferences to explain/interpret the grounding data $40g$, thereby creating the causal graph CG. The causal variables (e.g., including the causal variables $cv_{(i-1)}$, $cv_i$, $cv_{(j-1)}$, and $cv_j$) of the causal graph CG (or the number of the causal variables) and a causal structure (e.g., C) are determined at the same time; therefore, the causal planning module 120P may differentiate (a) from (b) of FIG. 4, and vice versa.

As shown in FIG. 4, each causal variable (e.g., the causal variable $cv_i$) may correspond to an observation function (e.g., the observation function $f_i$). In one embodiment, an observation function (e.g., the observation function $f_i$) may be calculated/derived using a causal semantic generative (CSG) model so as to predict low-dimensional state attributes (e.g., attribute(s) of the state of the causal variable $cv_i$) from high-dimensional environmental variables (e.g., the grounding data $40g$). When causal variables (e.g., $cv_{(i-1)}$, $cv_i$, $cv_{(j-1)}$, and $cv_j$) are manually defined (e.g., by domain expert(s)), each causal variable (e.g., the causal variable $cv_i$) may have a dedicated causal semantic generative observation function CSG( ) (serving as its observation function) to ground the causal variable onto the corresponding data (e.g., the data $w_i$) (e.g., a framed area in FIG. 4). Moreover, the causal semantic generative model may avoid deeming variation factor(s) cause(s) of a causal variable (e.g., the causal variable $cv_i$), and may correctly determine semantic factor(s) to be cause(s) of the causal variable. In one embodiment, variation factor(s) and semantic factor(s) may constitute/belong to observation data. In one embodiment, the causal semantic generative model is primarily based on causal invariance principle and involves variational Bayes.

In one embodiment, the observation function $f_i$ may satisfy $s_{i,t}=f_i(w_{i,t})$. In one embodiment, the observation function $f_i$ may be implemented using multivariate Gaussian distribution: for example, the observation function $f_i$ may satisfy $$f_i(w_i, z) = N\left(\begin{pmatrix} W_i \\ Z \end{pmatrix} \middle| \begin{pmatrix} \mu_{w_i} \\ \mu_Z \end{pmatrix}, \Sigma\right).$$

Alternatively, the observation function $f_i$ may be related to $$N\left(\begin{pmatrix} W_i \\ Z \end{pmatrix} \middle| \begin{pmatrix} \mu_{w_i} \\ \mu_z \end{pmatrix}, \Sigma\right),$$

where z may denote data (which does not contribute to the causal variable $cv_i$) within the grounding data $40g$, $\mu_{w_i}$, $\mu_v$ may denote means fixed as zero vectors, $\Sigma$ may be parameterized by Cholesky decomposition to satisfy, for example, $\Sigma=LL^T$. The matrix L may be a lower-triangular matrix with positive diagonals and may, for example, be parameterized to satisfy $$L = \begin{pmatrix} L_{w_i w_i} & 0 \\ M_{zw_i} & L_{zz} \end{pmatrix}.$$

Each of the matrixes $L_{w_i w_i}$, $L_{zz}$ may be smaller lower triangular matrixes. The matrix $M_{zw_i}$ may be any arbitrary matrix. Each of the matrixes $L_{w_i w_i}$, $L_{zz}$ may be parameterized by a summation of positive diagonal elements (guaranteed via an exponential map) and a lower triangular matrix (without positive diagonal elements).

Figure 5:
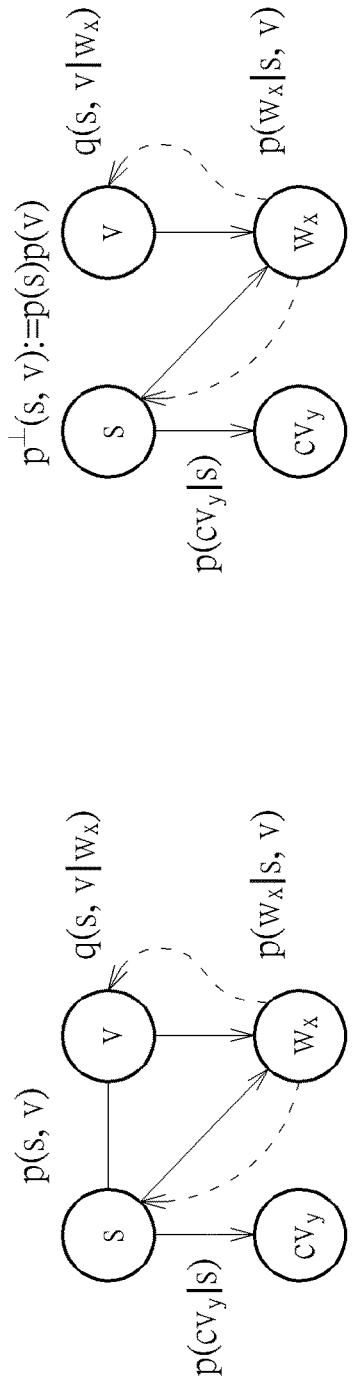
FIG. 5 is a schematic diagram of a causal variable and data according to an embodiment of the present invention.
Figure 5:
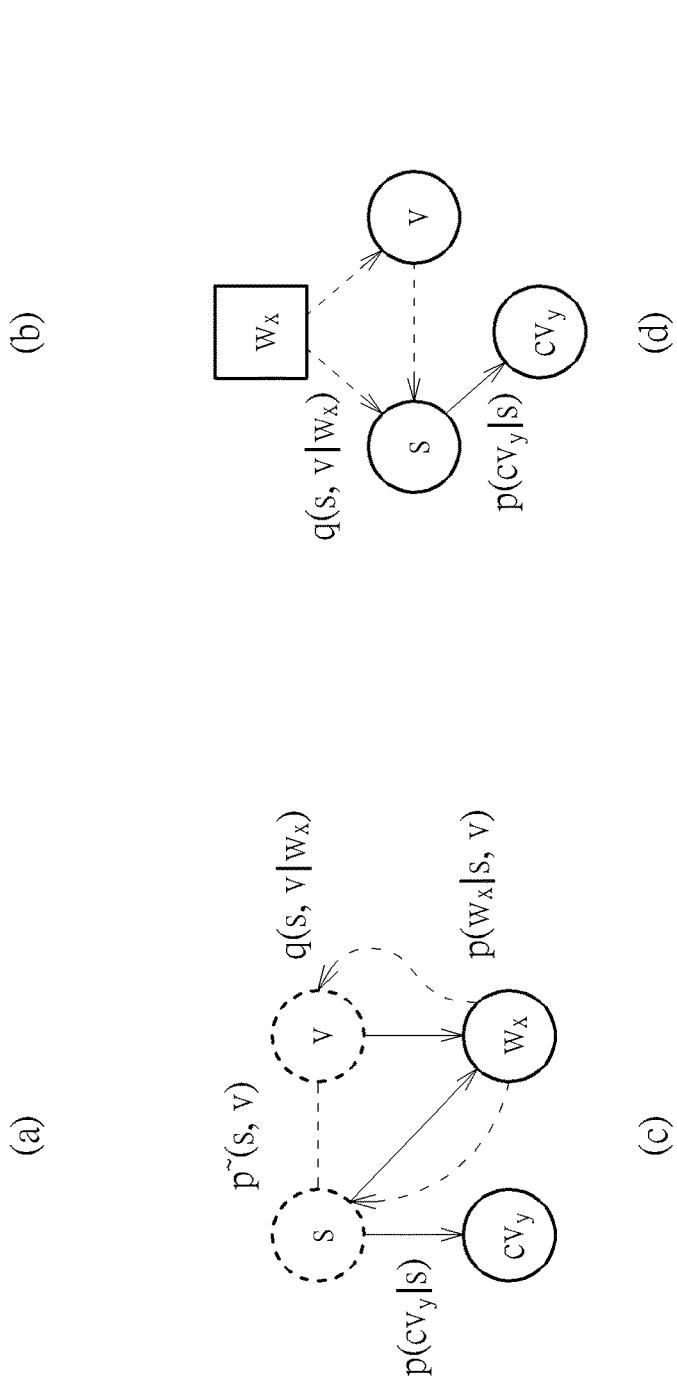

In one embodiment, the relationship between causal variables (e.g., the causal variable $cv_i$) and data (e.g., the data $w_i$) may be unknown, but the causal variables may be predicted/inferred from the data using a causal semantic generative model. For example, FIG. 5 is a schematic diagram of a causal variable $cv_y$ and data $w_x$ according to an embodiment of the present invention, where (a), (b), (c), and (d) respectively illustrate structure possibilities of the causal semantic generative model, s may represent a semantic factor, v may represent a variation factor, solid arrows may represent causal mechanisms $p(w_x|s, v)$ and $p(cv_y|s)$, dashed arrows may represent inference models $q(s, v|w_x)$ for learning. In (a) of FIG. 5, a solid undirected line between the semantic factor s and the variation factor v may represent a domain-specific prior p(s, v). Compared with the solid undirected line between the semantic factor s and the variation factor v in (a) of FIG. 5, (b) of FIG. 5 introduces an independent prior $p^⊥(s, v):=p(s)p(v)$ to reflect intervention so as to improve out-of-distribution generalization performance. Compared with the solid undirected line between the semantic factor s and the variation factor v in (a) of FIG. 5, (c) of FIG. 5 introduces a prior $p\tilde{\,}(s, v)$ of a dotted line between the semantic factor s and the variation factor v to reflect intervention according to causal invariance principle so as to leverage unsupervised data. In one embodiment, the present invention may fit the causal semantic generative model p:=<p(s, v), $p(w_x|s, v)$, $p(cv_y|s)$> to data by maximizing likelihood, perform calculation using variational inference and evidence lower bound (ELBO), and use Monte Carlo to estimate expectations after applying reparameterization tricks.

In another embodiment, an observation function (e.g., the observation function $f_i$) may be obtained/derived using a deep learning model so as to predict low-dimensional state attributes (e.g., attribute(s) of the state of the causal variable $cv_i$) from high-dimensional environmental variables (e.g., the grounding data $40g$). However, in addition to semantic factor(s), a deep learning model may misjudge variable factor(s) as cause(s) of a causal variable (e.g., the causal variable $cv_i$).

In FIG. 2, since a deep learning model requires an optimizer to evaluate the input for a predicted output, which is time-consuming and resource-intensive, there is no deep learning model used in FIG. 2 to improve efficiency and reduce power consumption. Also, the present invention leverages cause-and-effect relationship instead of statistical association of a deep learning model to correlate a received signal to its transmitted signal accurately, and thus reduces transmission error rate.

Figure 6:
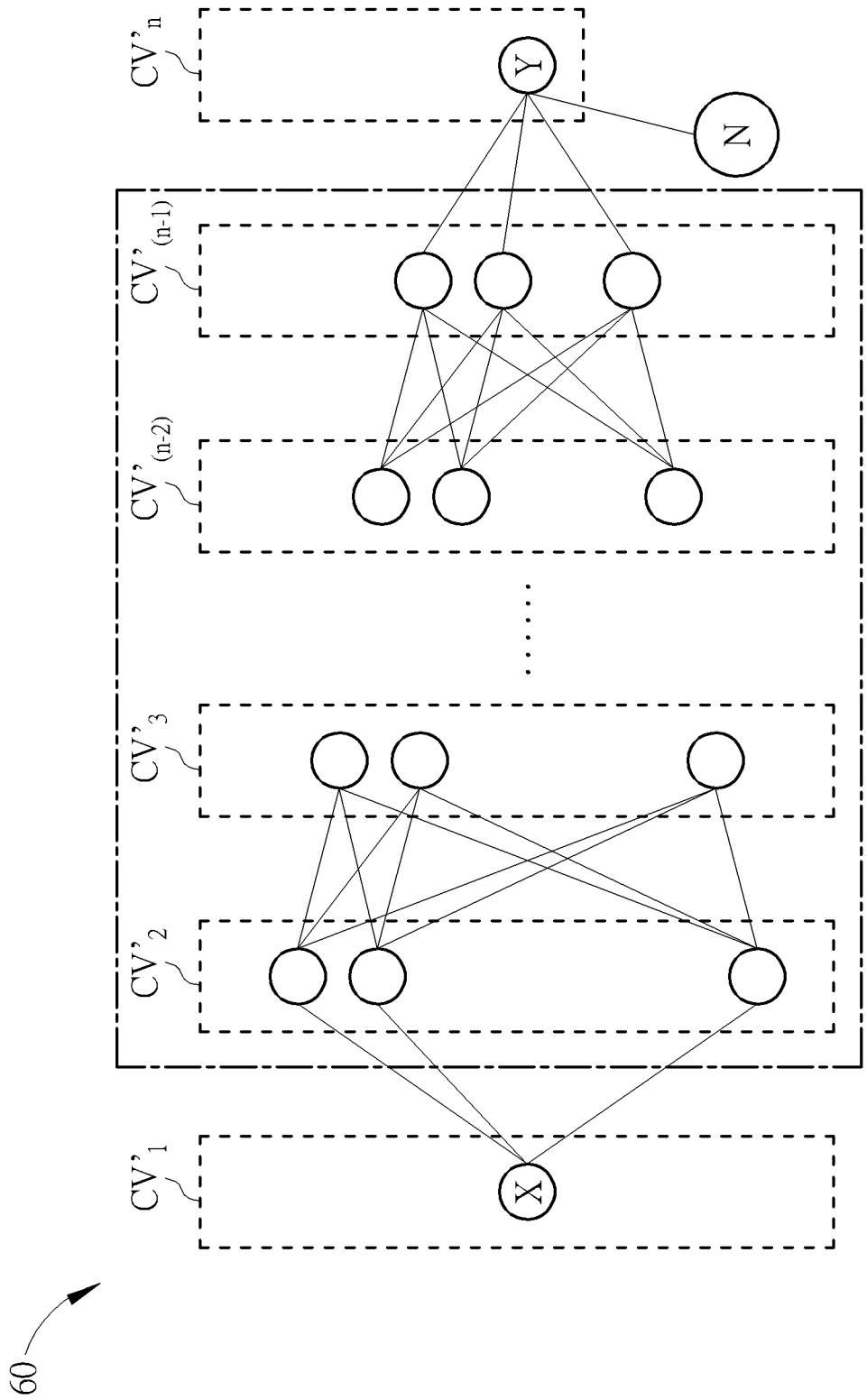
FIG. 6 is a schematic diagram of a simulated deep learning model.

In another embodiment, a simulated deep learning model may replace the channel matrix H to obtain/infer the transmitted signal X (i.e., to figure out the original signal Z). The transmitted signal X and the received signal Y may be correlated by using a simulated deep learning model. The communication system 10 may perform encoding, decoding, or channel estimation according to the simulated deep learning model. For example, FIG. 6 is a schematic diagram of a (simulated) deep learning model 60. In FIG. 6, $CV'_1$ may represent output value(s) of an input layer of the simulated deep learning model 60, and $CV'_1$ may, for example, represent the transmitted signal X. In FIG. 6, $CV'_2$-$CV'_{(n-1)}$ may represent output values of hidden layers of the simulated deep learning model 60 after calculated by an activation function ReLu( ). In FIG. 6, $CV'_n$ may represent output value(s) of an output layer of the simulated deep learning model 60, and $CV'_n$ may, for example, represent the (predicted/inferred) received signal Y. N may represent noise.

Please refer to FIG. 2 and FIG. 6. In one embodiment, a causal graph (e.g., the causal graph CG or a causal graph used by the causal model 20) may be obtained/created from grounding data (e.g., the grounding data $40g$) based on the simulated deep learning model 60. As shown in FIG. 2, the causal graph used by the causal model 20 may include causal variables $CV_1$-$CV_n$. The causal variable $CV_1$ may correspond to the output (value) $CV'_1$ of the input layer of the simulated deep learning model 60. The causal variables $CV_2$-$CV_{(n-1)}$ may respectively correspond to the output (values) $CV'_2$-$CV'_{(n-1)}$ of the hidden layers of the simulated deep learning model 60 after calculated by the activation function. For example, equations such as $CV'_2$=ReLu(CSG $(CV'_1)$), $CV'_3$=ReLu(CSG(ReLu(CSG($CV'_1$)))), or $CV'_{(n-1)}$=ReLu(CSG( . . . ReLu(CSG($CV'_1$))))  may be satisfied, where CSG( ) may represent a causal semantic generative observation function. According to $CV'_2$=ReLu (CSG($CV'_1$)), the output (value) $CV'_2$ is at least related to a result which is mapped from the output (value) $CV'_1$ using the causal semantic generative observation function CSG( ) and then converted using the activation function ReLu( ). Each attribute of a causal variable (e.g., the causal variable $CV_2$) may correspond to a neuron of a hidden layer. The causal variable $CV_n$ may correspond to the output (value) $CV'_n$ of the output layer of the simulated deep learning model 60. For example, an equation $CV'_n$=CSG($CV'_{(n-1)}$)+N may be satisfied.

In one embodiment, the specific/exact value of noise in the process of changing the transmitted signal X shown in FIG. 1 into the received signal Y through the channel 140 does not have much meaning by itself. Because the noise is randomly varying (e.g., under Gaussian distribution), the value of noise that affects a reference signal (of the transmitted signal X) may not necessarily be same as the value of noise that affects a non-reference signal (of the transmitted signal X) (such as data, a control signal, or other signals). The noise value keeps changing and it is of no use to use the specific noise value. The specific value of noise obtained/derived/decoded from a reference signal (of the received signal Y) may not necessarily be same as the noise value used to decode/derive a non-reference signal (of the received signal Y) (such as data, a control signal, or other signals) because the noise value changes randomly. Noise may be time-variant or space-variant. Each individual noise value calculated does not have much meaning because the noise value may not be directly applicable to decode other signal. However, overall properties (e.g., mean, variance, statistical distribution, or other statistical characteristics of noise) of random noise may be important information used in signal-to-noise ratio (SNR) estimation. In one embodiment, the noise value of the noise N of a causal model (e.g., the causal model 20) (e.g., the values of components $n_1$-$n_k$) may be set to the mean (value) of the noise N.

There are several ways to estimate signal-to-noise ratio. In one embodiment, the average signal-to-noise ratio $\rho_{av}$ of the received k'-th orthogonal frequency-division multiplexing (OFDM) preamble may satisfy $$p_{av}(k') = \frac{E\left\{\frac{1}{NN'}\Sigma_{n'=0}^{NN'-1}|\sqrt{S}\,C(k',n')H(n')|^2\right\}}{E\left\{\frac{1}{NN'}\Sigma_{n'=0}^{NN'-1}|\sqrt{W}\,\eta(k',n')|^2\right\}},$$

where NN' may indicate that a preamble includes NN' modulated subcarriers, S may represent the power of the transmitted signal X, C(k', n') may represent data symbol on the n'-th subcarrier in the k'-th preamble, H(n') may represent frequency response of a channel, W may represent power of the noise N, η(k', n') may represent sampled complex zero-mean additive white Gaussian noise (AWGN) of unit variance, E( ) may represent expected value. In one embodiment, the average signal-to-noise ratio ρ of the n'-th subcarrier may satisfy $$p(k',n') = \frac{E\{|\sqrt{S}\,C(k',n')H(n')|^2\}}{E\{|\sqrt{W}\,\eta(k',n')|^2\}}.$$

However, the present invention is not limited thereto.

In one embodiment, a causal graph of the present invention (e.g., the causal graph CG of FIG. 4) may be validated or processed according to a structural causal model.

Figure 7:
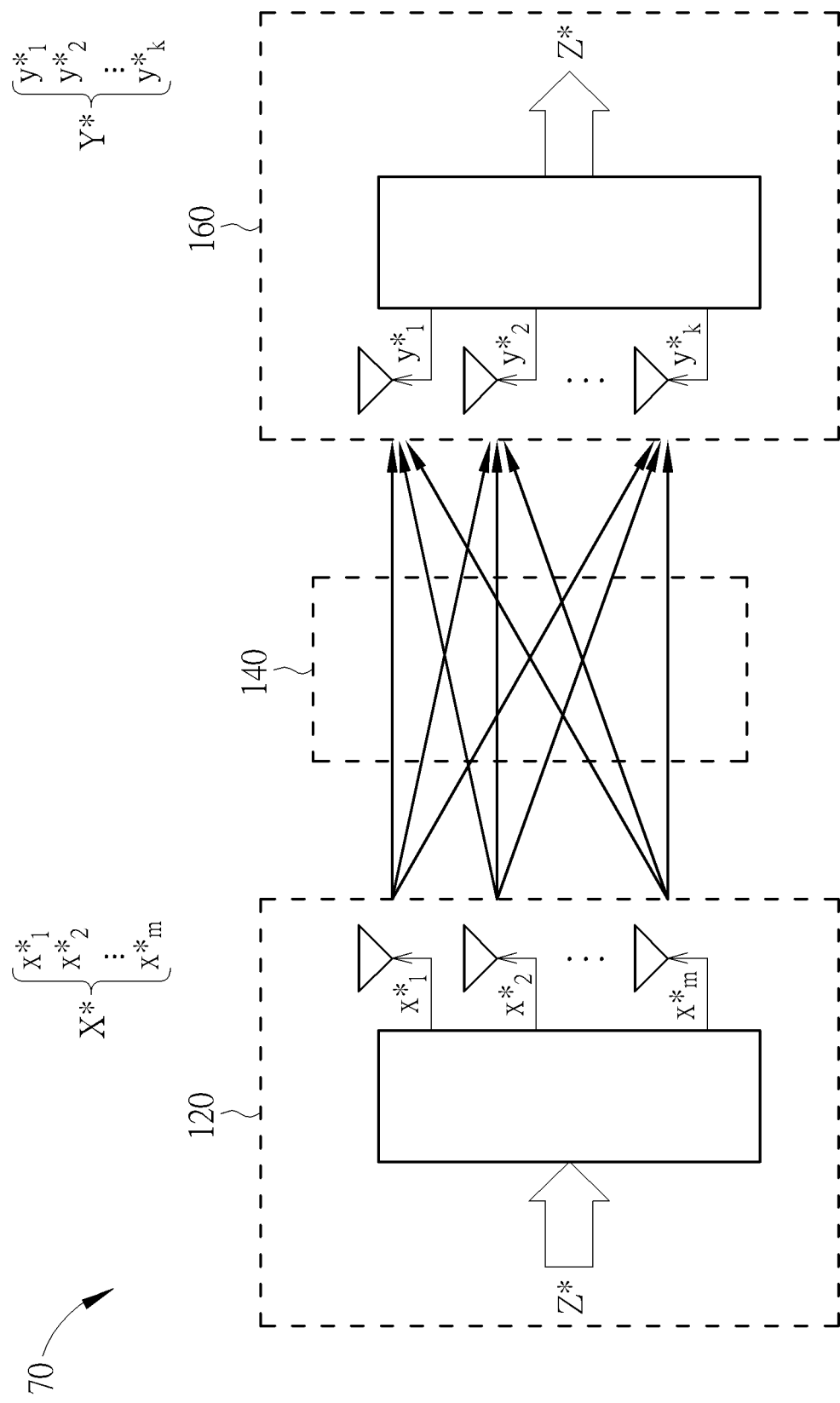
FIG. 7 is a schematic diagram of a communication system according to an embodiment of the present invention.

FIG. 7 is a schematic diagram of a communication system 70 according to an embodiment of the present invention. The communication system 70 may include the transmitter 120 and the receiver 160.

In one embodiment, the transmitter 120 may transform/convert/distort an original signal Z* into a transmitted signal X* and send the transmitted signal X* out. The original signal Z* may be different from the transmitted signal X*. For example, the original signal Z* and the transmitted signal X* may satisfy X*=H$^{-1}$(Z*−N) or Z*=HX*+N, where H may represent the channel matrix of the channel 140, the channel matrix H may be an m×k matrix, and N may represent noise. The transmitted signal X* may include transmitted signal components x*$_1$-x*$_m$. Each of the transmitted signal components x*$_1$-x*$_m$ may be transmitted by at least one of the transmitting antennas of the transmitter 120 through the channel 140.

The transmitted signal X* (which may include data, reference signal(s) (which may be omitted in some embodiments), or other signals) may be transformed/distorted by the channel 140 to become a received signal Y*. In one embodiment, the transmitted signal X*, the original signal Z* and the received signal Y* may satisfy Y*=HX*+N=H (H$^{-1}$(Z*−N))+N=Z*.

The receiver 160 may receive/detect the received signal Y*. The received signal Y* may include received signal components y*$_1$-y*$_k$. Each of the received signal components y*$_1$-y*$_k$ may be received by at least one of the receiving antennas of the receiver 160. The received signal Y* received by the receiver 160 through the receiving antenna(s) may include the noise N and the transmitted signal X* distorted by the channel matrix H. However, the original signal Z* is substantially the same as (or highly similar to) the received signal Y* (e.g., Z*=Y*). The original signal Z may include components y*$_1$-y*$_k$. The receiver 160 may obtain information equivalent to or similar to the original signal Z* according to the received signal Y* (without doing channel estimation). In other words, the receiver 160 may obtain/extract/figure out information of the original signal Z* directly. The receiver 160 may obtain/find/recover the original signal Z without removing distortion and the noise N caused by the channel 140 according to X*=H$^{-1}$(Y*−N), thereby simplifying design of the receiver 160 and saving computation and (battery) power consumption of a central processing unit.

In one embodiment, before the transmitter 120 sends the transmitted signal X* to the receiver 160, the original signal Z* may be changed/distorted/transformed into the transmitted signal X*, so that the receiver 160 may obtain/get information equivalent to the original signal Z* or similar to the original signal Z* (without doing channel estimation). In one embodiment, the mean (value) of statistical properties of noise may be used to distort/change/transform the original signal Z* into the transmitted signal X* before the transmitted signal X* is sent from the transmitter 120 to the receiver 160 so that there is no need for the receiver 160 to do channel estimation to recover/convert from the received signal Y* to the transmitted signal X* (or the original signal Z*).

In one embodiment, similar to the communication system 10 in FIG. 1, a causal model (e.g., a structural causal model, or the causal model 20 shown in FIGS. 2 and 3) may replace the channel matrix H, so that the present invention may obtain/infer/figure out the transmitted signal X* from the original signal Z*. When the transmitted signal X* and the received signal Y* are correlated using a causal model, the transmitted signal X* causing the received signal Y* (i.e., the original signal Z*) may be reversely determined/calculated/inferred at least based on abductive reasoning (i.e., backward reasoning) (by the transmitter 120), so that the received signal Y* affected by the channel 140 may be equal to the original signal Z* or a signal similar to the original signal Z*. Based on abductive reasoning, a causal graph (e.g., the causal graph CG shown in FIG. 4) used by a causal model (e.g., the causal model 20 shown in FIGS. 2 and 3) help to infer the original signal Z* as one or more possibilities of the transmitted signal X*. This improves prediction accuracy and reduces the number of training samples required.

As set forth above, when the transmitter 120 is scheduled to send the transmitted signal X*, the transmitter 120 may transmit the transmitted signal X* which is obtained/derived/figured out based on abductive reasoning from the original signal Z* (i.e., information of the received signal Y*) by setting the noise N as the mean (value). The received signal Y* received by the receiver 160 is substantially identical to (information of) the original signal Z* or similar to (information of) the original signal Z*. In this way, there is no need to do channel estimation and the design, power consumption and hardware utilization (e.g., CPU utilization) may be saved a lot. In other words, compared with the communication system 10 in FIG. 1, the communication system 70 is beneficial to reducing (battery) power consumption of the receiver 160 and utilization rate of the central processing unit.

In another embodiment, similar to the communication system 10 of FIG. 1, the channel matrix H may be replaced by a simulated deep learning model (e.g., the simulated deep learning model 60 of FIG. 6) for the communication system 70.

In one embodiment, a causal model (e.g., causal model 20) may be stored in a high-level physical layer (H-PHY) of a distribution unit (DU), but is not limited thereto.

In one embodiment, the original signal Z, Z*, the transmitted signal X, X*, and the received signal Y, Y* may be radio-frequency signals, and the frequency spectrum may be in a range of 1 kHz to 300 GHz, but is not limited thereto.

In one embodiment, the communication system 10 may be utilized to perform communications for downlinks. The transmitter 120 may be a radio unit (RU) and the receiver 160 may be a customer-premises equipment (CPE). However, the present invention is not limited thereto.

For example, the transmitter 120 may be a base station such as a node B, an evolved-node B (eNB), a next generation-node B (gNB), a sector, a base transceiver system (BTS), an access point (AP), a relay node, a remote radio head (RRH), a small cell, a base station controller (BSC), or a fixed station that exchange data and control information with user side or another base station. The receiver 160 may be user side such as a user equipment (UE), a terminal equipment, a mobile station (MS), or a fixed or mobile device.

In one embodiment, the communication system 10 may be utilized to perform communications for uplinks. The transmitter 120 may be a customer-premises equipment and the receiver 160 may be a radio unit. However, the present invention is not limited thereto. For example, the transmitter 120 may be user side, and the receiver 160 may be a base station.

Figure 8:
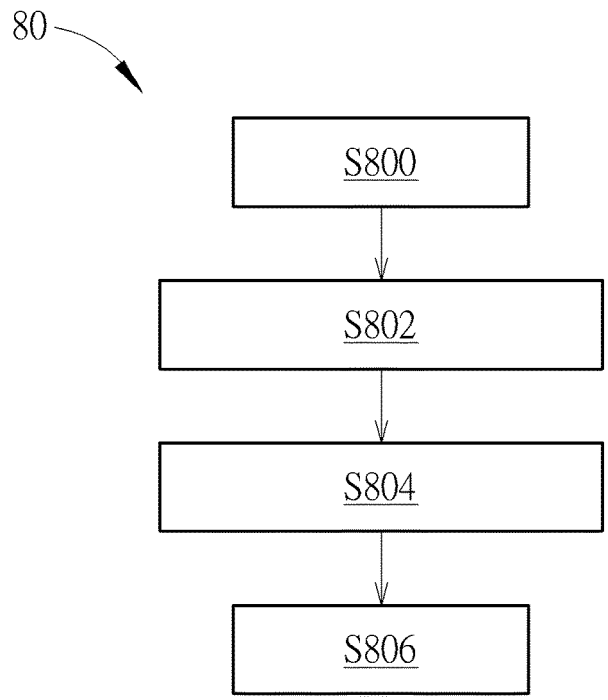
FIG. 8 and FIG. 9 are flowcharts of communication methods according to embodiments of the present invention.

FIG. 8 is a flowchart of a communication method 80 according to an embodiment of the present invention. The communication method 80 is available to the receiver 160. The communication method 80 may be compiled into a code, which may be executed by a processing circuit and stored in a storage circuit. The steps of the communication method 80 may include the following steps:

Step S800: Start.

Step S802: Receive a received signal (e.g., the received signal Y or Y*). The transmitter 120 obtains a transmitted signal (e.g., the transmitted signal X or X*) according to an original signal (e.g., the original signal Z or Z*). The transmitter 120 sends the transmitted signal. The transmitted signal is changed into the received signal after passing through the channel 140.

Step S804: Obtain information of the original signal according to the received signal. A structural causal model (e.g., the causal model 20) is used to correlate the transmitted signal and the received signal. Causal variables and a causal structure of a causal graph (e.g., the causal graph CG) of the structural causal model between the transmitted signal and the received signal are determined together.

Step S806: End.

Figure 9:
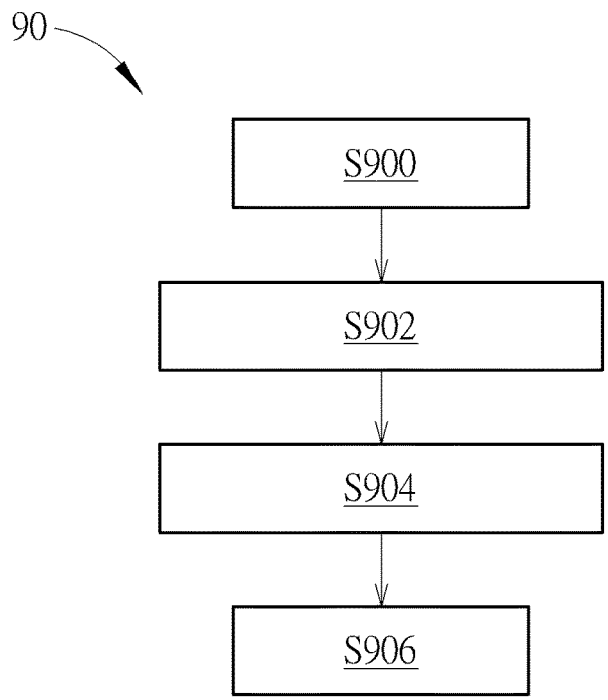

FIG. 9 is a flowchart of a communication method 90 according to an embodiment of the present invention. The communication method 90 is available to the transmitter 120. The communication method 90 may be compiled into a code, which may be executed by a processing circuit and stored in a storage circuit. The steps of the communication method 90 may include the following steps:

Step S900: Start.

Step S902: Obtain a transmitted signal (e.g., the transmitted signal X or X*) according to an original signal (e.g., the original signal Z or Z*).

Step S904: Transmit a transmitted signal. The transmitted signal is changed into a received signal (e.g., the received signal Y or Y*) after passing through the channel 140, the receiver 160 obtains information of the original signal according to the received signal. A structural causal model (e.g., the causal model 20) is used to correlate the transmitted signal and the received signal. Causal variables and a causal structure of a causal graph (e.g., the causal graph CG) of the structural causal model between the transmitted signal and the received signal are determined together.

Step S906: End.

In one embodiment, the storage circuit is configured to store image data or instructions. The storage circuit may be a subscriber identity module (SIM), a read-only memory (ROM), a flash memory, a random access memory (RAM), a disc read-only memory (CD-ROM/DVD-ROM/BD-ROM), a magnetic tape, a hard disk, an optical data storage device, a non-volatile storage device, a non-transitory computer-readable medium, but is not limited thereto.

In one embodiment, the processing circuit is configured to execute instructions (stored in the storage circuit). The processing circuit may be a microprocessor, or an application-specific integrated circuit (ASIC), but is not limited thereto.

The present invention may leverage cause-and-effect relationship to obtain/calculate/figure out the original signal instead of using statistical association to obtain the original signal, such that the received signal may be accurately correlated with the transmitted signal, thereby reducing transmission error rate. The present invention may avoid doing channel estimation at user side to obtain/calculate/figure out the original signal, thereby reducing the consumption of power and processor utilization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication method, for a receiver, comprising:
   receiving a received signal, wherein a transmitter obtains a transmitted signal according to an original signal, the original signal is substantially equal to or identical to the transmitted signal, the transmitter sends the transmitted signal, and the transmitted signal is changed into the received signal after passing through a channel; and
   obtaining information of the original signal according to the received signal, wherein the transmitted signal and the received signal are correlated using a structural causal model, and a plurality of causal variables and a causal structure of a causal graph of the structural causal model between the transmitted signal and the received signal are determined together;
   wherein the received signal is inferred into a plurality of combinations at least based on abductive reasoning, each of the plurality of combinations includes a candidate transmitted signal and a noise value, a preferred transmitted signal is selected from the plurality of candidate transmitted signals according to a signal-to-noise ratio, and the preferred transmitted signal is corresponding to the transmitted signal to convert the received signal into the original signal at least based on abductive reasoning.

2. The communication method of claim 1, wherein the causal graph is generated based on maximum a posteriori and point estimation.

3. The communication method of claim 1, wherein a plurality of data in a grounding data is mapped to the plurality of causal variables of the causal graph by using a plurality of observation functions, to generate the causal graph from the grounding data based on maximum a posteriori and point estimation.

4. The communication method of claim 2, wherein the plurality of observation functions are obtained based on a causal semantic generative model.

5. The communication method of claim 1, wherein the receiver is one of a user side equipment and a system comprising a radio unit and a distributed unit, and the transmitter is the other one of the user side equipment and the system.

6. The communication method of claim 1, wherein the received signal includes the transmitted signal after distortion and noise, and at least one noise value corresponding to the structural causal model is set to a mean value of the noise.

7. The communication method of claim 1, wherein the received signal is inferred into the plurality of combinations according to the causal graph at least based on abductive reasoning.

8. The communication method of claim 1, wherein a plurality of posterior probabilities of assigning a plurality of data of a grounding data to a plurality of observation functions and the causal structure of the causal graph are maximized to generate the causal graph, wherein one of the plurality of posterior probabilities is proportional to $\Pi_{t=0}^{T} P(w_{i,t}|s_{t-1},C,f_i)^{(T-t)^{-\gamma}}$, where $w_{i,t}$ denotes first data of the plurality of data at a time instant t, $s_{t-1}$ denotes at least one state at a time instant t−1, C denotes the causal structure, $f_i$ denotes a first observation function of the plurality of observation functions, T denotes a current time instant, and γ is a real number, wherein the first data and the first observation function correspond to a first causal variable of the plurality of causal variables.

9. A communication device, for a receiver, comprising:
a storage circuit, configured to store instructions of:
receiving a received signal, wherein a transmitter obtains a transmitted signal according to an original signal, the original signal is substantially equal to or identical to the transmitted signal, the transmitter sends the transmitted signal, and the transmitted signal is changed into the received signal after passing through a channel; and
obtaining information of the original signal according to the received signal, wherein the transmitted signal and the received signal are correlated using a structural causal model, and a plurality of causal variables of a causal graph of the structural causal model and a causal structure of the causal graph are determined together; and
a processing circuit, coupled to the storage device, configured to execute the instructions stored in the storage circuit;
wherein the received signal is inferred into a plurality of combinations at least based on abductive reasoning, each of the plurality of combinations includes a candidate transmitted signal and a noise value, a preferred transmitted signal is selected from the plurality of candidate transmitted signals according to a signal-to-noise ratio, and the preferred transmitted signal is corresponding to the transmitted signal to convert the received signal into the original signal at least based on abductive reasoning.

10. A communication method, for a transmitter, comprising:
obtaining a transmitted signal according to an original signal, wherein the original signal is substantially equal to or identical to the transmitted signal;
transmitting the transmitted signal, wherein the transmitted signal is changed into a received signal after passing through a channel, a receiver obtains information of the original signal according to the received signal, the transmitted signal and the received signal are correlated using a structural causal model, and a plurality of causal variables of a causal graph of the structural causal model and a causal structure of the causal graph are determined together;
wherein the received signal is inferred into a plurality of combinations at least based on abductive reasoning, each of the plurality of combinations includes a candidate transmitted signal and a noise value, a preferred transmitted signal is selected from the plurality of candidate transmitted signals according to a signal-to-noise ratio, and the preferred transmitted signal is corresponding to the transmitted signal to convert the received signal into the original signal at least based on abductive reasoning.

11. The communication method of claim 10, wherein the causal graph is generated based on maximum a posteriori and point estimation.

12. The communication method of claim 10, wherein a plurality of data in a grounding data is mapped to the plurality of causal variables of the causal graph by using a plurality of observation functions, to generate the causal graph from the grounding data based on maximum a posteriori and point estimation.

13. The communication method of claim 11, wherein the plurality of observation functions are obtained based on a causal semantic generative model.

14. The communication method of claim 10, wherein the receiver is one of a user side equipment and a radio unit, and the transmitter is the other one of the user side equipment and the radio unit.

15. The communication method of claim 10, wherein the received signal includes the transmitted signal after distortion and noise, and at least one noise value corresponding to the structural causal model is set to a mean value of the noise.

16. A communication device, for a transmitter, comprising:
a storage circuit, configured to store instructions of:
obtaining a transmitted signal according to an original signal, wherein the original signal is substantially equal to or identical to the transmitted signal;
transmitting the transmitted signal, wherein the transmitted signal is changed into a received signal after passing through a channel, a receiver obtains information of the original signal according to the received signal, the transmitted signal and the received signal are correlated using a structural causal model, and a plurality of causal variables of a causal graph of the structural causal model and a causal structure of the causal graph are determined together; and
a processing circuit, coupled to the storage device, configured to execute the instructions stored in the storage circuit;
wherein the received signal is inferred into a plurality of combinations at least based on abductive reasoning, each of the plurality of combinations includes a candidate transmitted signal and a noise value, a preferred transmitted signal is selected from the plurality of candidate transmitted signals according to a signal-to-noise ratio, and the preferred transmitted signal is corresponding to the transmitted signal to convert the received signal into the original signal at least based on abductive reasoning.

\* \* \* \* \*